July 12, 1960
W. B. PESTER
2,944,776
PROJECTOR TILT ADJUSTMENT
Filed March 22, 1956
2 Sheets-Sheet 2
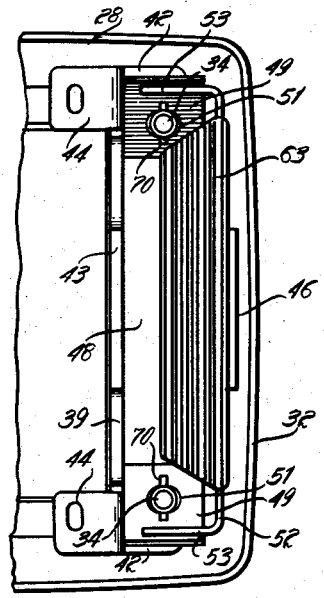
Fig.2
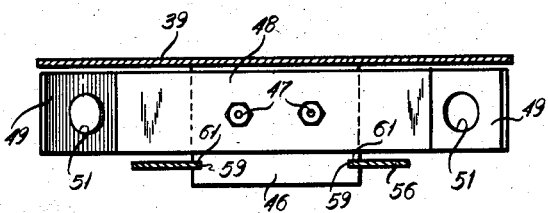
Fig.6
Fig.4
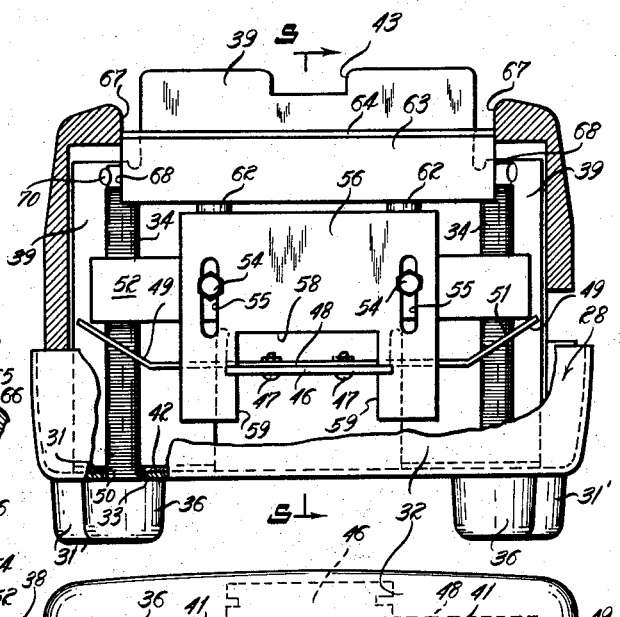
Fig.5
Fig.3
W. BRUCE PESTER
BY
Strauch, Nolan & Neale
ATTORNEYS 2,944,776
Patented July 12, 1960

2,944,776
PROJECTOR TILT ADJUSTMENT

William Bruce Pester, Ann Arbor, Mich., assignor, by mesne assignments, to Sylvania Electric Products Inc., Wilmington, Del., a corporation of Delaware Filed Mar. 22, 1956, Ser. No. 573,293

10 Claims. (Cl. 248—11)

This invention relates to picture projectors and particularly improved mechanism for determining and maintaining the angle of tilt of projection for accurately locating the projected picture upon a screen or the like.

The invention comprises in its preferred embodiment a novel mechanism for simultaneously adjusting two front corner posts of a projector support by simultaneously releasing holding means for the two posts and permitting gravity control of the position of the posts as the projector is tilted from the table on which is is placed and for maintaining any given adjustment.

It is therefore the major object of the invention to provide a novel projector elevator or tilt adjustment mechanism which does not embody the usual leveling screws and which is easily and speedily operated to effect and hold the desired adjustment.

A further object of the invention is to provide a novel projector elevator device wherein two vertically disposed front posts are held in adjusted position by spring locking means which are simultaneously released when adjustment of the tilt of the projector is desired.

A further object of the invention is to provide a novel elevator adjustment for a picture projector or the like wherein a vertically slidable support post passes through an aperture in an inclined spring locking plate which maintains selected vertical positions of the post and wherein the post is released for axial displacement where said plate is deflected toward the horizontal.

Further objects of the invention reside in the details of the aforementioned adjusting mechanism recited in the claims herein.

Further objects of the invention will also appear as the description proceeds in connection with the appended claims and the annexed drawings wherein:

Figure 2 is a top plan view of the tilt adjustment mechanism with the portions of the projector housing that normally cover it being omitted to show details of construction;

Figure 3 is a fragmentary view looking up at the bottom of the front end of the projector of Figure 1;

Figure 4 is a front elevation partially broken away to further show the tilt adjustment mechanism;

Figure 5 is a section substantially taken on line 5—5 of Figure 4 and showing further details of the tilt adjustment mechanism; and Figure 6 is a section taken on line 6—6 of Figure 4 and showing further details of the tilt adjustment mechanism.

Figure 1:
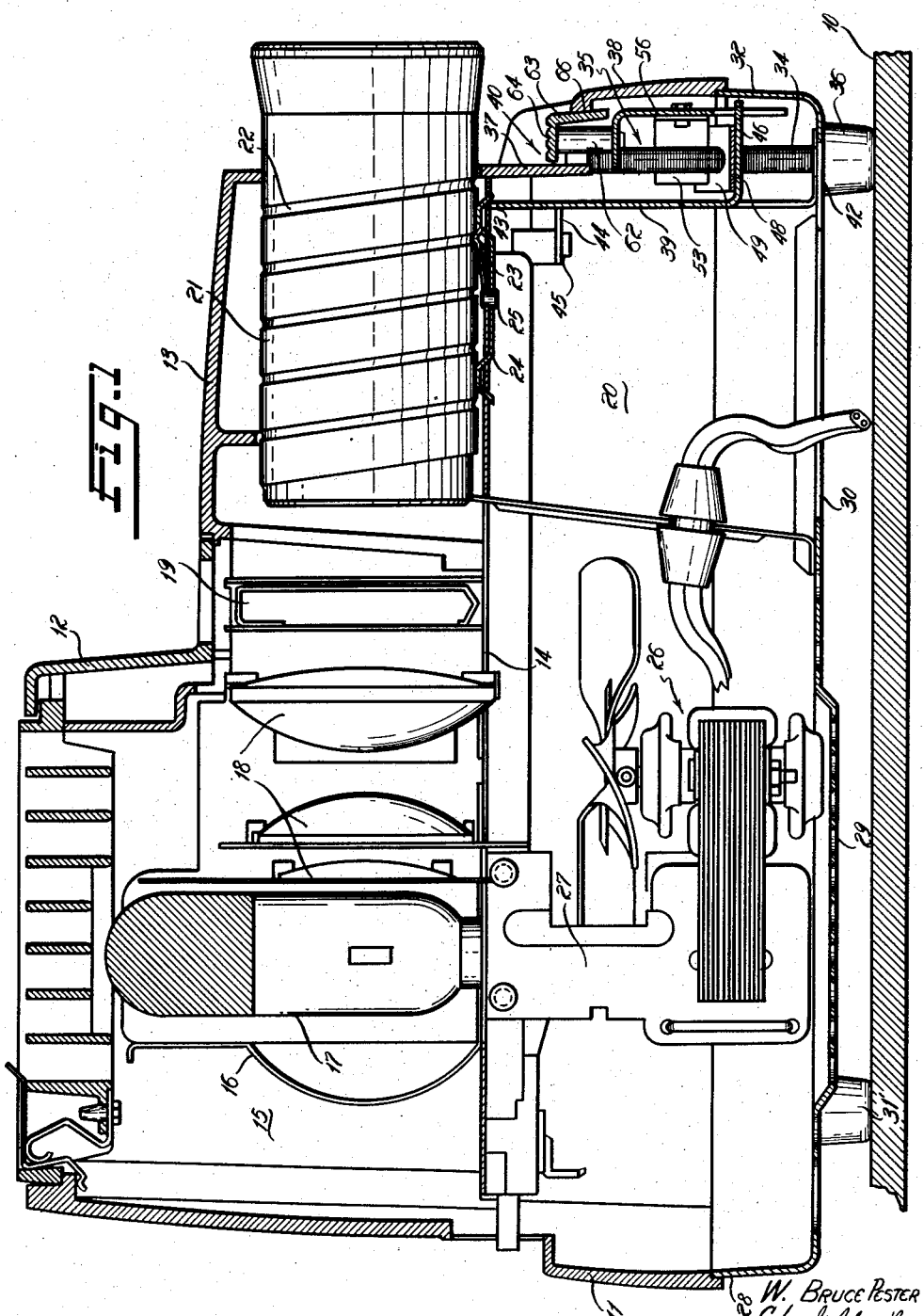
Figure 1 is a side elevation mainly in section showing a projector of the type to which tilt adjustment mechanism of a preferred embodiment of the invention was applied.

Referring to Figure 1, the projector assembly comprises a casing 11 comprising a lamp housing 12 from which projects forwardly a lens tube support 13. The casing is divided by a generally horizontal plate 14 into an upper compartment 15 which contains the optics of the projector and a lower compartment 20 which contains essentially the cooling fan, elevator mechanism and the electrical switch and connections. In compartment 15 are located the reflector 16, projection lamp 17, condenser lens assembly 18, slide carrier 19 and the objective lens tube 21 which is adjustable long the optical axis of the projection system and maintained in that adjustment by coaction of a spiral groove 22 on the lens tube and a spring detent 23 upstanding from the plate 14. A spring beam 24 which is secured intermediate its ends to plate 14 as by rivet 25 bears upon the lens tube laterally and maintains it against lateral looseness.

In bottom compartment 20 the cooling motor and fan assembly 26 are suspended by means of a bracket 27 from the plate 14 and adapted to direct cooling air up through said suitable holes in plate 14 for cooling the lamp, lenses and the slide in carrier 19.

The bottom of the projector is covered by a tray-like member 28 suitably secured to casing 11. Member 28 is reticulated at the portion 29 on its bottom below the fan assembly and is provided with an aperture 30 at its front end below the lens tube. At its rear end, the bottom of member 28 has affixed thereto two rear legs 31' which are essentially rubber feet of the same size suitably secured to the tray bottom as by bolts. These are fixed and incapable of adjustment and are located essentially at the opposite rear corners of the tray 28. Tray 28 has an upright front wall portion 32.

As shown in Figure 3 at the opposite front corners of the bottom of tray 28 are provided integral tabs 31 formed with apertures 33 through which loosely extend the threaded legs 34 of the front corner posts 35 which are formed at their lower ends with rubber feet 36 that are of the same size as those comprising the rear legs 31' so that when the front posts 35 are in their completely retracted position shown in Figures 1 and 4 and the projector is on a flat surface the optical axis is parallel to that surface. Tabs 31 thus limit upward displacement of posts 35. In Figure 3 one of the posts is shown in position and the other is removed to show the hole 33.

Referring to Figure 1 it will be noted that the upper front casing wall 37 is located just rearwardly of the lower front wall 38, there being a shoulder between them transversely slotted at 40. The tilt adjustment mechanism, to be hereinafter described, is disposed mainly below that slot. Inwardly of wall 37 a rigid sheet metal plate 39 is fixed upon the tray bottom as by screws 41 extending through tabs 31 and threaded into forwardly bent right angle tabs 42 which overlie tray tabs 31 and are secured thereto tightly by the screws 41 as shown in Figure 3. Near its upper end the wall of the plate 39 may be interlocked with plate 14 as at 43 so that it helps to support the forward end of plate 14 in the assembly and is provided with rearwardly bent tabs 44 through which extend bolts 45 to secure it to casing portions. In any event plate 39 is rigid and perpendicular with respect to the optical axis of the assembly.

As shown best in Figures 4 and 5 plate 39 is cut out at its lower portion centrally thereof and bent forward at right angles to provide a rigid support tab 46 which terminates just short of the upright tray wall 32. Secured to tab 46 as by a pair of bolt assemblies 47 is the horizontal straight middle portion of a stiff strip of spring metal 48 which at opposite ends is formed with angularly upwardly inclined portions 49 disposed at about 45° to the horizontal each of which circularly is apertured at 51 to permit the passage of the leg 34 of one of the front corner posts. It will be noted that both of the front corner post legs 34 are serrated as by a fine helical surface thread cut or otherwise surface roughened. When the upwardly inclined spring arms 49 are in their normal preformed position shown in Figure 4 the dimension of the apertures 51 relative to the diameter of the posts 54 is such that legs 34 are gripped thereby and held against axial movement. Tabs 42 are formed with apertures 50 above apertures 33 in the tray tabs to allow free vertical sliding of the post legs therethrough during adjustment.

A device is now provided for simultaneously bending both spring arms 49 downwardly to loosen the edge grip of apertures 51 for effecting simultaneous release of the legs 34 of the front corner ports to free them for vertical movement. This device comprises a vertically slidable assembly having a transverse release bar 52 which as shown in Figure 2 has its opposite ends bent back at right angle to provide arms 53 disposed above the outer ends of the spring arms 49. The central portion of release bar 52 is adjustably secured by means of a screw and slot assembly indicated at 54, 55 to an upright stiff sheet metal plate 56 which as shown in Figure 5 has its upper end bent over rearwardly at right angles to form a ledge 57. At its lower end plate 56 is formed with a rectangular cut out portion 58 having parallel vertical edges 59 which as shown in Figure 6 fit slidably into shallow parallel edge slots 61 formed in the part of tab 46 that projects forwardly beyond the spring 48.

Ledge 57 supports two rigid posts 62 that are fixed at their upper ends to a horizontal handle bar 63 corrugated at its top at 64 and having a flat front guide face 65 adapted to bear slidingly against the flat vertical front face of slot 40. As shown in Figure 4 the casing slot 40 is formed with parallel vertical flat end guide surfaces 67 which are in sliding contact with the flat vertical end 68 of the handle bar 63 in the assembly. Thus when the trip device is to be mounted in the casing it is simply dropped by gravity through the slot 40 with plate 56 positioned and vertically slidable on the horizontal rigid tab 46 by means of its interlock with the slots 61 until arms 53 engage spring arms 49. The entire device thus rests most of its weight on the outer ends of the arms 49 but this is not enough to bend those arms. The trip device is prevented from tilting forwardly or rearwardly by engagement with the slot sides.

In operation when it is desired to elevate the front end of the projector from the position shown in Figure 1, which is its lowermost position wherein all four legs front and rear of the projector are of the same length below the tray 28 and therefore the projector is on a horizontal axis, the operator merely depresses the handle bar 63 by pushing downwardly on the surface 64 and this force is transmitted through the plate 56 and the release bar arms 53 to bend down the outer ends of the arms 49 toward the horizontal until they assume a position where the edges of the openings 51 no longer grip the serrated surfaces of the legs 34. When these legs 34 are thus released and the front end of the projector casing is raised away from the table the posts 35 displace downwardly freely through the holes 50 and 33, maintaining engagement with the table surface 10. When the correct elevation of the front end of the projector is reached, which the operator can notice by noting the position of the picture projected on the screen, he merely releases the handle bar 63 and the spring arms 49 are of sufficient strength to immediately move the entire trip device back upwardly to its original position shown in Figure 5 and in doing so they relock openings 51 with the serrated legs 34 of the front posts and thereby maintain the adjustment.

When it is desired to lower the projector, the spring arms 49 are disengaged from the post legs in the same manner and the projector body is simply pushed down toward the table and released only when the bottom of the tray contacts the top of the feet 36 which means that the projector is horizontal.

It will be noted that the upper ends of each of the post legs 34 are provided with a radial projection 70 which is long enough such that the posts cannot drop through the openings 51, 50 or 33 and therefore cannot become disengaged from the projector body. This projection 70 also serves as a limit to the amount that the projector is tilted because in some projectors too much tilt may short circuit the filament of the projection lamp.

While the invention has been described in its preferred embodiment as a simultaneous release for two corner posts of a projector assembly, it will be appreciated that the principles of the invention as set out in the broader claims are applicable to projectors of the type which use a three cornered support and where a single adjustable post of the type of 35 in the assembly is mounted at the center portion of the front end of the base and would be operated by a slidable trip device acting on an upright spring holding spring arm just as in the above-described embodiment.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a tilt adjustment for a picture projector or the like, a support on which the optical system of the projector is mounted, a front post slidably mounted for vertical displacement on and with respect to said support, said post being formed at its lower end to rest on a table or like platform, a normally inclined spring lock arm mounted on said support apertured to permit passage of said post and biased to normally grip said post with the aperture edges to prevent said displacement, said spring lock arm being a bendable spring beam having one end secured upon said support, and movable control means on said support operable for engaging and bending said spring lock arm until its aperture edges no longer grip the post to permit vertical displacement of said post to obtain a desired tilt position of said support, said spring lock arm returning to its normal inclined post locking position to maintain said support tilted when said means is released.

2. In the tilt adjustment defined in claim 1, there being two front posts slidably mounted on said support at opposite front corners thereof and an inclined spring lock arm on said support associated with each post, and wherein said movable control means simultaneously bends each spring lock arm.

3. In the tilt adjustment defined in claim 1, said post being surface roughened along its length where it passes through the apertured spring arm, to increase the gripping action of said arm on said port.

4. In an elevation device for adjustably tilting the front end of a picture projector having a casing on which optical elements of the projector are mounted, a front post having a platform contacting foot at its lower end and a vertical leg extending freely through an opening in the bottom of the casing, an inclined stiff spring arm fixed at one end within the casing and having an aperture whose edges are adapted to grip and lock the leg of the post in its normal inclined position, and a tripping device slidably mounted on the casing adapted to engage the outer end of spring arm to bend the arm toward a horizontal position to align the aperture with the axis of the post leg sufficiently to free it from locking engagement therewith whereby free vertical movement of the post leg with respect to the casing is permitted while the spring arm is so deflected.

5. In a picture projector assembly wherein the optical elements are mounted on a support and two spaced front corner posts are mounted for free vertical sliding movement in the front end of the projector support, two oppositely inclined stiff spring arms disposed at substantially the same angle to the horizontal each fixed at one end to said support and apertured to receive said posts with opposed aperture edges gripping opposite sides of the posts to lock with them in the normal inclined positions of said arms, and a release device slidably mounted on the support to simultaneously contact and depress the outer ends of said arms to release said posts for free vertical sliding with respect to the support in the assembly.

6. In an elevator device for effecting tilt adjustment in a picture projector or the like, a support for the optical elements of said projector, two posts vertically slidably mounted on said support, means on said support mounting two oppositely inclined spring plates at substantially the same level, said plates being apertured to pass said posts with the aperture edges gripping said posts to normally lock them against axial displacement and a tripping device vertically slidably mounted on said support and having spaced rigid arms adapted to contact the respective spring plates for deflecting them to non-locking position with respect to said posts when said device is depressed by the operator, said spring plates being sufficiently strong to return said tripping device back to original position and relock with said posts when said tripping device is released by the operator.

7. In an elevator device for a picture projector or the like, a support on which the optical elements of the projector are mounted, a rigid upright member on said support, oppositely inclined laterally extending apertured spring arms on said member, vertically slidable posts on said support passing through said spring arms in locking engagement with the aperature edges and a release device slidable vertically on said member and having rigid arms for engaging the respective spring arms, said device when depressed by the operator effecting simultaneous deflection of said spring arms to unlock said posts for vertical displacement.

8. In the elevator device defined in claim 7, said upright member having a rigid forwardly projecting tab, and said spring arms comprising the opposite upwardly bent ends of a strip of stiff spring metal fixed intermediate its ends on said tab.

9. In the elevator device defined in claim 7, said upright member having a forwardly projecting rigid tab on which said spring arms are mounted and with which said release device is slidably connected.

10. In the elevator device defined in claim 7, said support comprising a casing having an upwardly open slot at its front end, and said release device being disposed with its upper end accessible in said slot for actuation by the operator.

References Cited in the file of this patent

UNITED STATES PATENTS

| | | |
|---|---|---|
| 1,190,664 | Meleady | July 11, 1916 |
| 2,302,134 | McNabb | Nov. 17, 1942 |
| 2,407,837 | Kissel | Sept. 17, 1946 |
| 2,449,424 | Stieber | Sept. 14, 1948 |
| 2,793,563 | Koskela | May 28, 1957 |
| 2,809,553 | Van Den Broek | Oct. 15, 1957 |